United States Patent
Kong et al.

(10) Patent No.: US 12,413,309 B2
(45) Date of Patent: Sep. 9, 2025

(54) AUTONOMOUS MINING SYSTEM BASED ON REAL-TIME DIGITAL VIDEO COMMUNICATION THAT USES ETHERNET AND OPTICAL TECHNOLOGIES

(71) Applicant: KING ABDULLAH UNIVERSITY OF SCIENCE AND TECHNOLOGY, Thuwal (SA)

(72) Inventors: Meiwei Kong, Thuwal (SA); Boon S. Ooi, Thuwal (SA); Tien Khee Ng, Thuwal (SA)

(73) Assignee: KING ABDULLAH UNIVERSITY OF SCIENCE AND TECHNOLOGY, Thuwal (SA)

( * ) Notice: Subject to any disclaimer, the term of this patent is extended or adjusted under 35 U.S.C. 154(b) by 228 days.

(21) Appl. No.: 17/923,960

(22) PCT Filed: May 18, 2021

(86) PCT No.: PCT/IB2021/054282
§ 371 (c)(1),
(2) Date: Nov. 8, 2022

(87) PCT Pub. No.: WO2021/234576
PCT Pub. Date: Nov. 25, 2021

(65) Prior Publication Data
US 2023/0188212 A1    Jun. 15, 2023

Related U.S. Application Data

(60) Provisional application No. 63/027,244, filed on May 19, 2020.

(51) Int. Cl.
H04B 10/116    (2013.01)
E21C 35/24    (2006.01)
(Continued)

(52) U.S. Cl.
CPC ......... *H04B 10/116* (2013.01); *H04B 10/672* (2013.01); *H04N 7/181* (2013.01); *E21C 35/24* (2013.01)

(58) Field of Classification Search
CPC .... H04B 10/116; H04B 10/672; H04N 7/181; E21C 35/24
(Continued)

(56) References Cited

U.S. PATENT DOCUMENTS

2006/0074525 A1*  4/2006  Close ................. B25J 9/1617
                                                700/245
2011/0164878 A1*  7/2011  Ma ................... H04W 88/085
                                                398/115
(Continued)

FOREIGN PATENT DOCUMENTS

CN    103437763 A    12/2013
CN    105680942 A    6/2016
(Continued)

OTHER PUBLICATIONS

International Search Report in corresponding/related International Application No. PCT/IB2021/054282, date of mailing Jul. 7, 2021.
(Continued)

*Primary Examiner* — Dalzid E Singh
(74) *Attorney, Agent, or Firm* — PATENT PORTFOLIO BUILDERS PLLC

(57) ABSTRACT

An autonomous mining system includes a real-time digital video transmission sub-system configured to obtain video streams from underground, and transfer the video streams to a control center located above ground; and an exploration and maintenance sub-system located underground, and configured to extract a resource and bring the resource to the
(Continued)

surface, based exclusively on commands received from the control center through the real-time digital video transmission sub-system.

20 Claims, 5 Drawing Sheets

(51) Int. Cl.
*H04B 10/67* (2013.01)
*H04N 7/18* (2006.01)

(58) Field of Classification Search
USPC .......................................................... 398/172
See application file for complete search history.

(56) References Cited

U.S. PATENT DOCUMENTS

| | | | |
|---|---|---|---|
| 2019/0007143 A1* | 1/2019 | Soto | H04B 10/502 |
| 2020/0014467 A1 | 1/2020 | Tan et al. | |
| 2020/0195343 A1* | 6/2020 | Solanki | H04B 10/1143 |

FOREIGN PATENT DOCUMENTS

| | | | |
|---|---|---|---|
| CN | 110602463 A | 12/2019 | |
| CN | 210274092 U | 4/2020 | |
| WO | WO-02061515 A2 * | 8/2002 | ............ B60W 50/02 |
| WO | 2010129944 A2 | 11/2010 | |

OTHER PUBLICATIONS

Naidu, K.P.S.S.V., et al., "Coal Mine Safety System Using Li-Fi Technology," International Journal of Advance Research, Ideas and Innovations in Technology (IJARIIT), Mar.-Apr. 2019, vol. 5, Issue 2, pp. 1288-1291.

Written Opinion of the International Searching Authority in corresponding/related International Application No. PCT/IB2021/054282, date of mailing Jul. 7, 2021.

First Examination Report in corresponding/related Saudi Arabian Patent Application No. 522441358, issued Mar. 19, 2023.

First Office Action in corresponding/related Chinese Application No. 202180037452.5, issued May 26, 2025.

* cited by examiner

AUTONOMOUS MINING SYSTEM BASED ON REAL-TIME DIGITAL VIDEO COMMUNICATION THAT USES ETHERNET AND OPTICAL TECHNOLOGIES

CROSS-REFERENCE TO RELATED APPLICATIONS

This application is a U.S. National Stage Application of International Application No. PCT/IB/2021/054282, filed on May 18, 2021, which claims priority to U.S. Provisional Patent Application No. 63/027,244, filed on May 19, 2020, entitled "REAL-TIME DIGITAL VIDEO TRANSMISSION SYSTEM AND METHOD BASED ON INDUSTRIAL ETHERNET AND OPTICAL WIRELESS COMMUNICATION TECHNOLOGY FOR COAL MINE MONITORING, COMMAND AND CONTROL," the disclosures of which are incorporated herein by reference in their entirety.

BACKGROUND

Technical Field

Embodiments of the subject matter disclosed herein generally relate to a system and method for video communication in an environment in which there is no natural light, and more particularly, to using a combination of Ethernet and Optical protocols for video communication in such an environment for resource exploration.

Discussion of the Background

Coal is the most abundant and widely distributed fuel resource in the world. In recent years, with the increase of mining depth and intensity, the number of coal-mine accidents in which human life is lost is increasing. Thus, there is a need to strengthen safety in production and improve the efficiency of early warning and rescue work in the mines. Of course, the same concerns are valid for any underground resource that require human presence in the mine.

Real-time digital video monitoring and remote control based on various communication protocols is considered as an extremely promising technology. For example, there is the possibility of using real-time video monitoring and remote control through a combination of Ethernet and Wi-Fi technologies, which is a relatively fast and straightforward way to get information from coal mines. In addition, considering the characteristics of most coal mines (e.g., the ubiquity of solid-state lighting infrastructure, no interference of natural light, and the particularity of electromagnetic environment), light emitting diodes (LED) or laser diodes (LD)-based optical wireless communication (OWC) combined with Ethernet is expected to play a vital role in complex mine environments [1]. Compared with the conventional radio frequency communication technologies (e.g., leaky feeder communication and Wi-Fi wireless communication), the OWC technology has unique advantages, such as high bandwidth, low latency, and electromagnetic interference immunity. In this regard, Chinese patent publication no. CN 105680942 [2] describes a visible light communication transceiver module for used in an underground mine.

However, the availability of the video communication in real-time inside a mine would not be able by itself to solve the safety problems typically encountered in a mining environment. More than that is required for saving human lives.

Thus, there is a need for a new system that is capable of exploring resources in a mine without human presence while being capable of being supervised, in real-time, by a human operator or an automated control center.

BRIEF SUMMARY OF THE INVENTION

According to an embodiment, there is an autonomous mining system that includes a real-time digital video transmission sub-system configured to obtain video streams from underground, and transfer the video streams to a control center located above ground, and an exploration and maintenance sub-system located underground, and configured to extract a resource and bring the resource to the surface, based exclusively on commands received from the control center through the real-time digital video transmission sub-system.

According to another embodiment, there is a method for autonomous mining exploration, and the method includes acquiring underground video streams with a real-time digital video transmission sub-system; transferring the underground video streams to a control center located above ground; analyzing the underground video streams for determining a position and a status of plural mobile nodes; generating commands at the control center with respect to future actions of the plural mobile nodes; transmitting the commands to the plural mobile nodes through a combination of Ethernet and visible light communication, VLC, protocols; and actuating the plural mobile nodes, exclusively based on the received commands, to execute the actions.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

The following description of the embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to an autonomous mining exploration system that communicates in real-time with a control center and/or a surface operator using a combination of Ethernet and OWC communication protocols. However, the embodiments to be discussed next are not limited to a mining operation, but may be applied to other environments where there is minimal natural light interference.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

According to an embodiment, a novel real-time digital video monitoring and remote control system, which is based on Ethernet and OWC, is configured to autonomously mine a given underground location, without the physical presence of an actual person. Thus, in case of mine accidents, no human life is in danger. To alleviate the link alignment issues between the various components of the system, diffused line-of-sight and non-line-of-sight communication configurations between OWC transceiver modules and OWC-based mobile video surveillance modules of the system is proposed. In one application, ultraviolet light-based non-line-of-sight communication devices are used. These features are now discussed in more detail.

Figure 1:
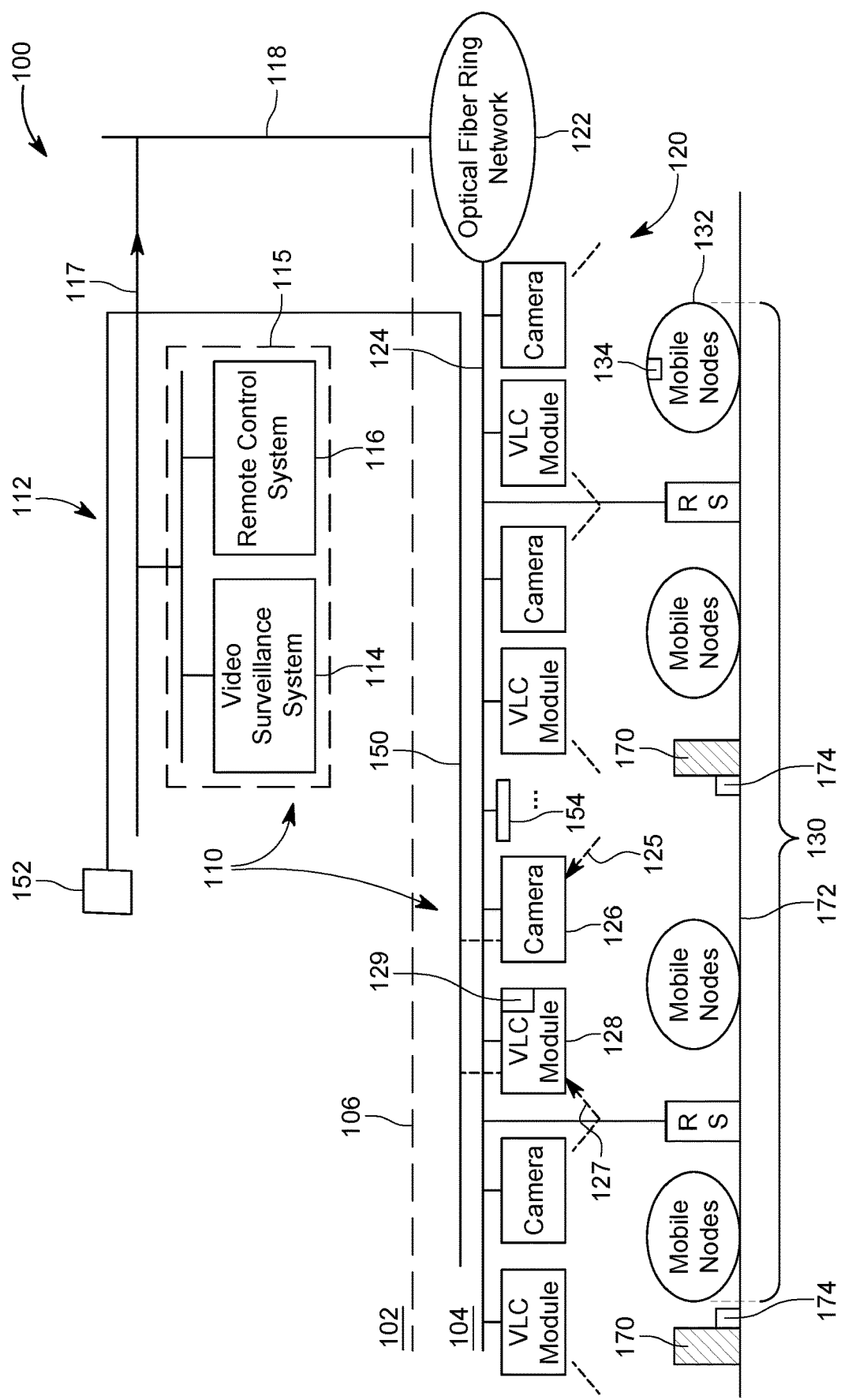
FIG. 1 is a schematic diagram of an autonomous mining system.

FIG. 1 illustrates the schematic diagram of an autonomous mining system 100 that includes a real-time digital video transmission sub-system 110, which is based on Ethernet and OWC communication technologies, and an exploration and maintenance sub-system 130, which is used underground to explore a resource, e.g., coal, in cooperation with the transmission sub-system 110. Thus, the autonomous mining system 100 includes underground and ground parts.

The transmission sub-system 110 has an above ground part 112 and a below ground part 120. An above ground region 102 and an underground region 104 are schematically separated in FIG. 1 by line 106. Thus, any element that is placed in the figure above line 106 is part of the above ground part 112, and any element that is placed below the line 106 is part of the below ground part 120 or the exploration and maintenance sub-system 130. The above ground part 112 includes a video surveillance system 114, a remote control system 116, and a communication network 118, which may be an optical fiber. The video surveillance system 114 and the remote control system 116 may be located together in a control center 115. The optical fiber 118 is used for uplink transmission of video streams and the downlink transmission of control commands for various mobile nodes.

The video surveillance system 114 may include one or more computing devices (for example, a computer) having one or more displays that may be monitored by a human. The system 114 may also include one or more applications that automatically analyze received video streams and using artificial intelligence, determines a status of the components (e.g., the mobile nodes) of the exploration and maintenance sub-system 130. The status of these components is then passed to the remote control system 116 so that a decision is made whether to instruct these components to change their status or let the components to continue to be in their original status. For example, if one component of the exploration and maintenance sub-system 130 is the mobile node 132 (e.g., drilling rig, forklift, bulldozer, grader, dump truck, or other known mining equipment), the remote control system 116, with or without the intervention of the human operator, analyzes the status of the mobile node 132 received from the video surveillance system 114, compares it with a pre-established operation plan, might verify the status of the neighboring mobile nodes to prevent a collision, and decides to either change or not the status of the mobile node. In one application, suppose that the mobile node is a dump truck and the video analysis determined that the dump truck if filled with ore. In this situation, the remote control system 116 instructs the dump truck 132, through the below ground part 120, to move from its current location to another location. At the same time, the remote control system 116 instructs a loader 132 to stop loading the dump truck, and either enter into an idle status, or move to load another dump truck. All these instructions are generated either based on a direct input from the operator of the system, or autonomously, based on pre-established rules that are stored in the remote control system 116. For these reasons, the remote control system 116 includes computing units, memories, monitors, computer applications, etc.

The video streams acquired by the underground part 120 of the video transmission sub-system 110 are moved to the above ground part 112 along an optical fiber ring network 122, and the communication network 118. The optical fiber ring network 122 collects all the video streams from the various branches of the mine, along dedicated optical fibers 124. For simplicity, the mine in FIG. 1 is shown having a single branch, but for practical mines, there are many branches at various levels underground. The optical fiber ring network 122 ensures that feeds from all the branches and all the levels are collected and sent to the surface equipment through the optical network 118.

FIG. 1 shows that the optical fiber 124 extends into a single branch of the mine and is connected to plural cameras 126 and plural visible light communication (VLC) modules 128. The cameras 126 and the VLC modules 128 are part of the underground part 120. The cameras 126 and the VLC modules 128 are physically attached to the walls or ceiling of the branch of the mine. The cameras 126 can be visible light cameras, infra-red cameras, etc. The VLC modules 128 can be implemented in various ways and a single module includes at least one OWC transceiver module 129, which is optically connected to the optical fiber 124. The OWC transceiver module 129 is used for data exchange with the mobile nodes 132, where each of the mobile nodes includes a corresponding OWC-based video collection and transceiver module 134.

Figure 2:
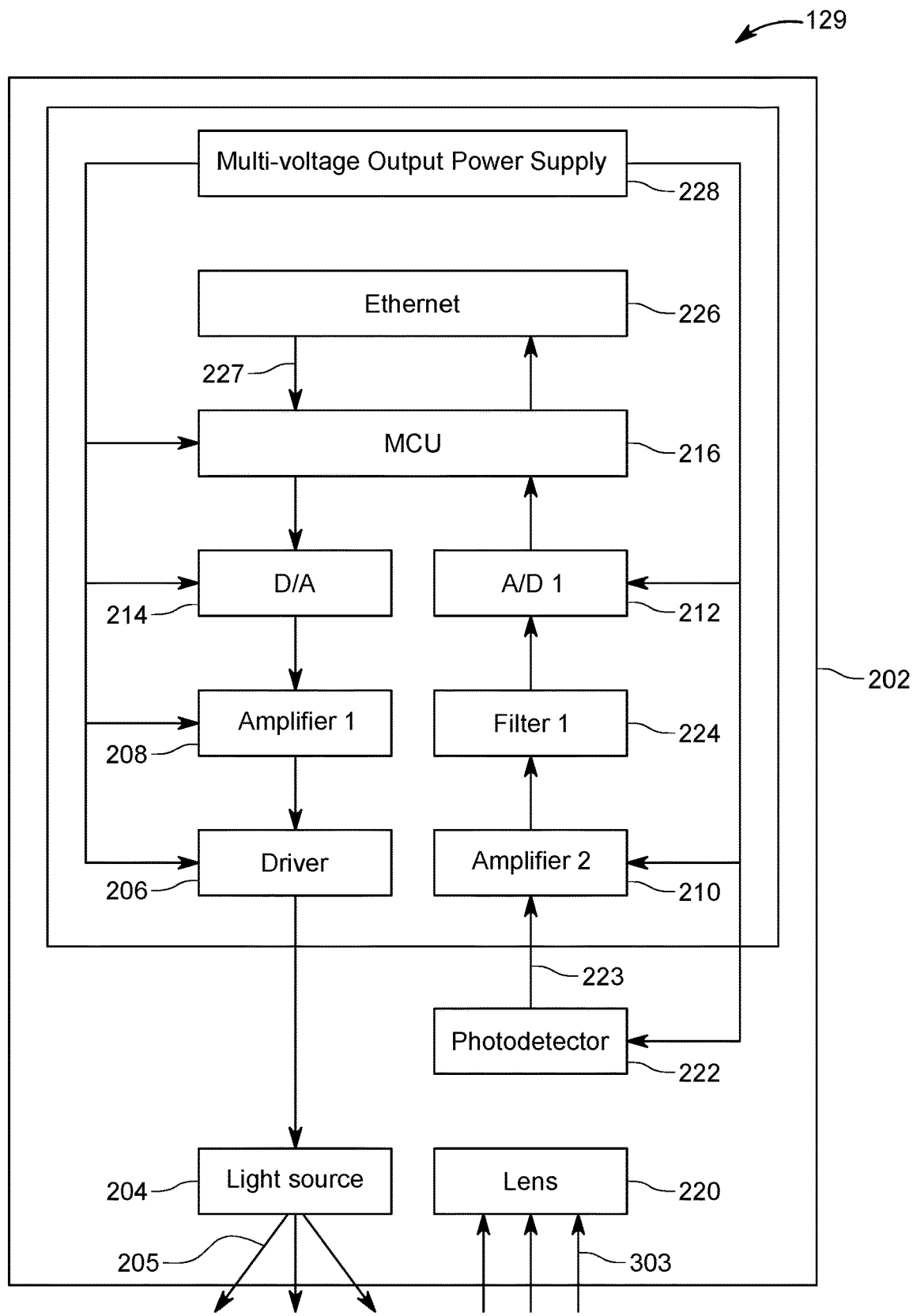
FIG. 2 is a schematic diagram of an OWC transceiver module.

FIG. 2 is a schematic diagram of the OWC transceiver module 129 mounted on the top or side wall of the mine. The OWC transceiver module 129 includes a housing 202 that houses a light source 204, a corresponding driver 206, two amplifiers 208 and 210, an analog-to-digital converter (A/D) 212, a digital-to-analog converter (D/A) 214, a microcontroller unit (MCU) 216, a lens 220, a photodetector 222, a filter 224, an Ethernet module 226, and a multi-voltage output power supply 228.

Figure 3:
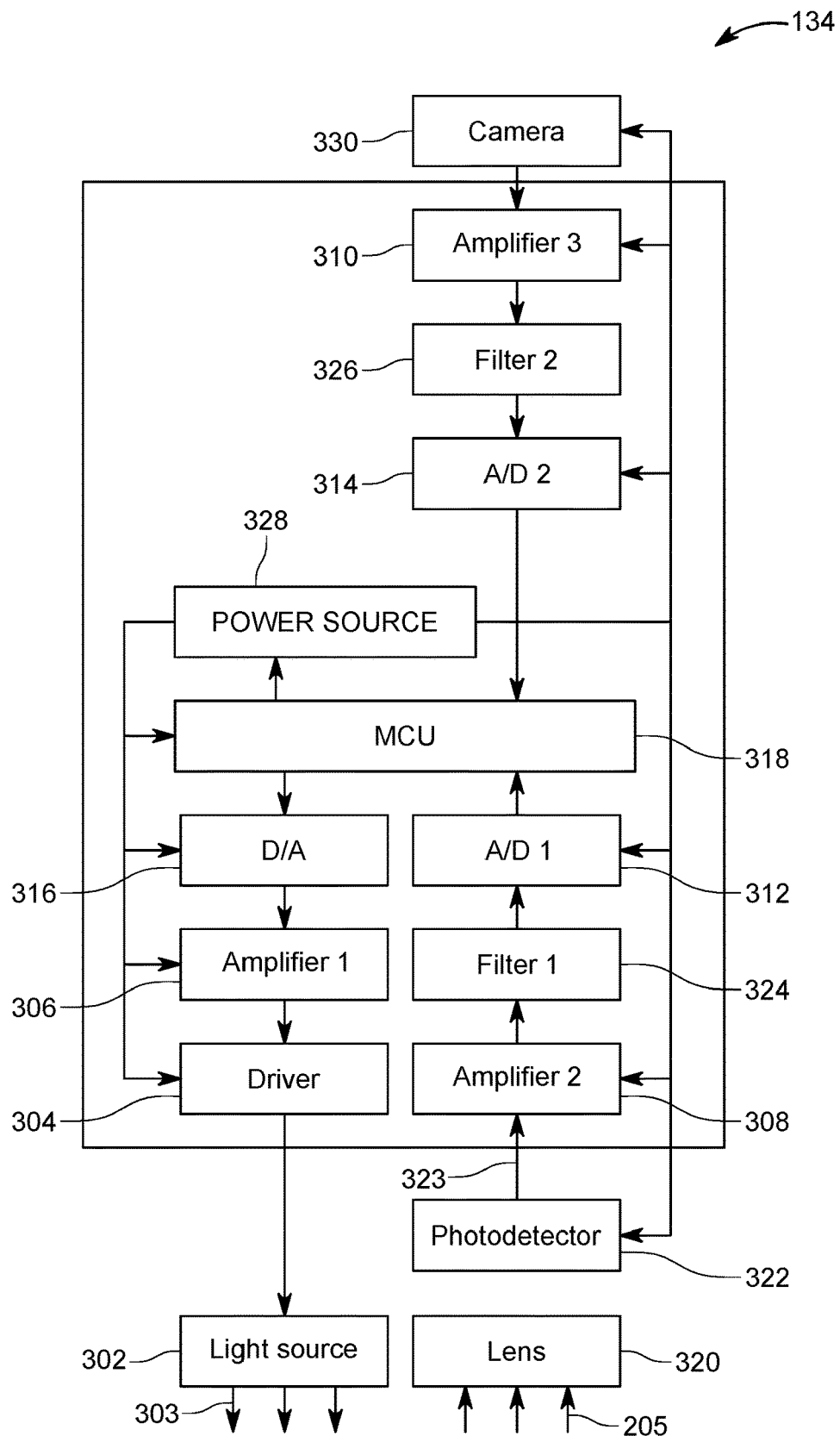
FIG. 3 is a schematic diagram of an OWC-based video collection and transceiver module.

FIG. 3 is the schematic diagram of the OWC-based video collection and transceiver module 134 installed on the mobile node 132. The OWC-based video collection and transceiver module 134 includes a light source 302, a corresponding driver 304, three amplifiers 306, 308, and 310, two A/Ds 312 and 314, a D/A 316, an MCU 318, a lens 320, a photodetector 322, two filters 324 and 326, a power source 328, for example, a rechargeable battery, and a camera 330.

The light sources 204 and 302 may be white-light light emitting diodes, laser diodes or any other novel light sources for simultaneous illumination and OWC. The drivers 206 and 304 are used to make the corresponding light sources work in a linear range and superimpose the electrical signals on the light source. The amplifiers 208, 210, 306, 308, and 310 are used for signal amplification. The A/Ds 212, 312 and 314 are used to convert analog signals into digital signals; the D/As 214 and 316 are used to convert digital signals into analog signals; the MCUs 216 and 318 are used for digital signal processing; the lenses 220 and 320 are used to adjust the size of the received light spot; the photodetectors 222 and 322 are used to convert the detected optical signals into electrical signals; the filters 224, 324, and 326 are used to remove the signal noise; the power sources 228 and 328 are used for voltage conversion and power supply. The Ethernet module 226 is used to transmit data between the optical fiber ring network 122 and the OWC transceiver module 129. The camera 330 in FIG. 3 is used for video monitoring of the mobile node and its environment.

The cameras 126 on the top or side walls of the mine monitor the general underground environment in real time and transmit corresponding first video streams 125 to the servers of the video surveillance system 114 in the control center 115 through the optical fiber ring network 122. The real-time video will be displayed on the video monitoring screens. Then, the control center 115 can send control commands to the OWC transceiver modules 129 through the optical fiber ring network 122 according to the specific requirements. The OWC transceiver modules 129 located on the top or side walls of the mine send the control commands to the OWC-based video collection and transceiver module 134 installed on the mobile nodes 132. The mobile nodes 132 perform the assigned tasks according to the control commands and transmit the collected video streams 127 to the OWC transceiver modules 129 through the OWC-based video collection and transceiver module 134. The OWC transceiver modules 129 transform the received video streams 127 into Ethernet format and send them and some other feedback information to the servers of the video surveillance system 114 in the control center 115 through the optical fiber ring network 122. Thus, the control center 115 receives first video streams 125 collected by the cameras 126 and second video streams 127 collected by the VLC modules 128. In addition, various other information may be collected by these elements, as the temperature, pressure, chemical air composition, etc. inside the mine.

According to an embodiment, there is a communication protocol between the OWC transceiver module 129, which is mounted on the top or side wall of the mine, and the OWC-based video collection and transceiver module 134, which is installed on the mobile node 132. In the downlink, the optical command signals 117 generated by the remote control system 116, are transmitted successively to the Ethernet module 226 (as the Ethernet module is optically connected to the optical fiber 124), then to the MCU 216, D/A 214, amplifier 208, driver 206, and finally to the light source 204. Note that the Ethernet module 226 is configured to transform the optical command signals 117 into electrical signals 227 so that the processor MCU 216 receives electrical signals. The light source 204 emits optical signals 205 that are being transmitted through an underground air channel to the mobile nodes 132. The optical signals 205 are focused into the photodetector 322 in the OWC-based video collection and transceiver module 134 by the lens 320. The detected signals 205 are transformed into electrical signals 323 by the photodetector 322, and are transmitted successively to the amplifier 308, filter 324, A/D 312, and finally to the MCU 318. The MCU 318 extracts the commands embedded into the electrical signals 323 and instructs the mobile node 132 to go to a designated place and perform tasks according to the control commands received from the remote control system 116.

In the uplink, the camera 330 of the OWC-based video collection and transceiver module 134 collects the local video at the designated location, for example, around the mobile node 132 and/or of the mobile node to determine a status of the node, and transmits the video stream to the amplifier 310, filter 326, A/D 314, and finally to the MCU 318. The MCU transmits the data to the D/A 316, amplifier 306, driver 304, and finally to the light source 302 for emitting optical signals 303 that include the desired information regarding the mobile node 132 and its environment. The light source 302 sends the optical signals 303 (which includes the video stream 127) through an air channel to the photodetector 222 of the OWC transceiver module 129, which is mounted on the top or side wall of the mine. After transforming the received optical signals 303 into electrical signals 223 with the photodetector 222, the electrical signals 223 are transmitted through the amplifier 210, filter 224, and A/D 212 to the MCU 216. The signals may be processed at the MCU 216 prior to being sent to the ethernet module 226, where the electrical signals are transformed into optical signals and transmitted along the optical fiber 124 and the optical fiber ring network 122 to the video surveillance system 114 in the control center 115.

The exploration and maintenance sub-system 130 includes, in addition to the plural mobile nodes 132, one or more recharge stations RS, which are configured to either sit on the floor of the mine or be attached to the wall of the mine. The recharge stations are configured to recharge the power source 328 of the OWC-based video collection and transceiver module 134 and, if the case, the batteries that power the mobile nodes 132. For example, the MCU 318 receives information from the power source 328 about its power level. When the power level is detected to be below a certain level, the MCU 318 instructs the mobile node 132 to move to the closest available recharge station, electrically connect to the recharge station, and recharge its power source to a minimum power level. These operations may be performed independent of the commands received from the control center 115. The recharge stations RS are electrically connected to a power supply line 150, as shown in FIG. 1. The power supply line 150 extends from a power generator 152, which is located above ground and which is configured to supply electrical power. The power supply line 150 is also connected to various light appliances 154, which are attached to the walls or ceiling of the mine. The power generator 152, the power supply line 150, and the various light appliances 154 are typically part of an existing mine, i.e., they are already there when the autonomous mining system 100 is deployed as each existing mine has such a power and light supply. Thus, the recharge stations RS, the VLC modules 128, and the cameras 126 can also be attached to the existing power supply line to supply them with electrical power.

The autonomous mining system 100 uses the video streams 125 and 127 obtained from both the cameras 126, which are fixedly attached to the walls or ceiling of the mine, and the cameras 330, which are attached to the mobile nodes. In this way, the video streams 125 and 127 cover the entire field of operation of the mobile nodes, from various angles, which allows the artificial intelligence software applications of the control center 115 and/or the human operator that might be present in the control center to have an accurate and detailed picture of the mining operations underground. In one application, each mobile node has its unique identification ID, so that specific commands may be transmitted from the control center to the mobile node. The mobile nodes and the control center can use a combination of communication protocols, which includes a wired communication protocol and a wireless communication protocol. The processors MCU and the Ethernet module 226 are responsible for "translating" the transmitted data from one protocol to the other protocol, either way. In one application, the data communication between the control center 115 and the VLC modules 128 is achieved by using the Ethernet. Ethernet is defined herein as being a communication protocol to link and connect computing devices to form a Local Area Network or LAN. Every device with Ethernet connectivity will have a Network Interface Card (NIC) which will store the device's unique physical address or identifier. This physical address is also called MAC (Media Access Control) address. The Ethernet protocol comes in various speed variants like the Standard Ethernet (10 Mbps), Fast Ethernet (100 Mbps), Gigabit Ethernet (1000 Mbps) and 10 Gigabit Ethernet (10 Gbps). Other communication protocols may be used over the communication network 118, optical fiber ring network 122, and the optical fiber 124.

The wireless communication protocol used between the VLC modules 128 and the mobile nodes 132 may include any known one. In order to send data over such a wireless channel, a modulation of the light is required. A modulation is the form in which the light signal varies in order to represent different symbols in order for the data to be decoded. Unlike radio transmission, a VLC modulation requires the light signal to be modulated around a positive dc value, responsible for the lighting aspect of the lamp. The modulation will thus be an alternating signal around the positive dc level, with a high-enough frequency to be imperceptible to the human eye or even with a low frequency, as no humans are expected to be present inside the mine. Due to this superposition of signals, implementation of a VLC transmitter usually require a high-efficiency, higher-power, slower response DC converter responsible for the LED bias that will provide lighting, alongside a lower-efficiency, lower-power, but higher response velocity amplifier in order to synthetize the required ac current modulation. There are several modulation techniques possible for this kind of communication, forming three main groups: Single-Carrier Modulated Transmission (SCMT), Multi-Carrier Modulated Transmission (MCMT), and Pulse-Based Transmission (PBT). In one application, the VLC module 128 can be used to replace the light appliance 154.

Figure 4:
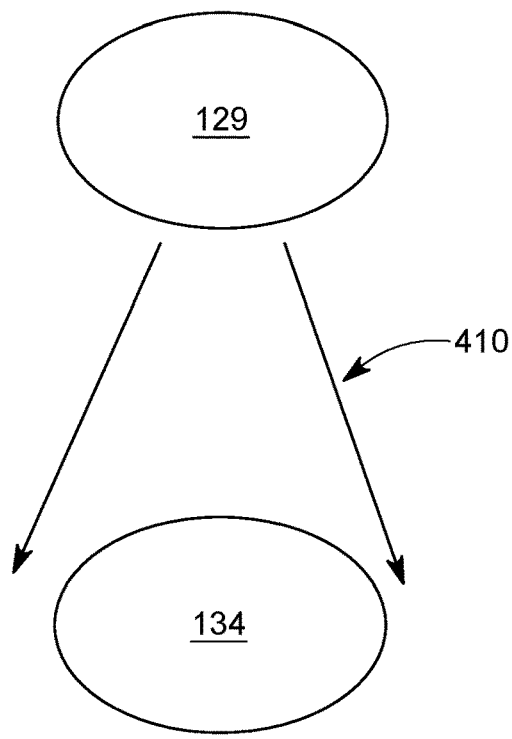
FIG. 4 illustrates a diffused line-of-sight communication configuration.
Figure 5:
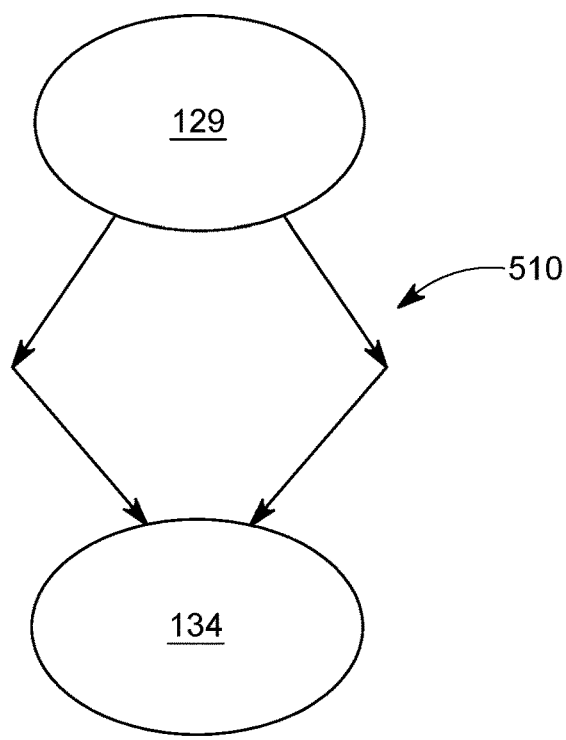
FIG. 5 illustrates a non-line-of-sight communication configuration.

Still with regard to the visible light communication channel, FIG. 4 shows the diffused line-of-sight configuration 410 and FIG. 5 shows the non-line-of-sight communication configuration 510 between the OWC transceiver module 129 and the OWC-based video collection and transceiver module 134. Compared with the conventional point-to-point communication configuration, both of the configurations shown in FIGS. 4 and 5 can significantly alleviate link alignment issues. For a diffused line-of-sight communication system, the light source has a large divergence angle, which enables a large communication coverage. For a non-line-of-sight communication system, the light beams will arrive at the detector after being scattered by impurity particles in the air of the mine or reflected by the wall, ground, or other obstacles found in the mine. It is worth noting that the scattering effect will be enhanced in the coal mine due to the Mie scattering of the impurity particles. Moreover, as the ultraviolet light incurs lower path loss in non-line-of-sight OWC when compared to the visible light, the utilization of ultraviolet light in the coal mine for the non-line-of-sight communication is promising.

The fact that the control center 115 receives general video streams 125 from the cameras 126, which show large portions of the mine and the mobile nodes scattered in those portions of the mine, and also receives local video streams 127 from the cameras 330 located on the mobile nodes 132, which show more detailed portions of the mine, right around the mobile node, allows the control center to receive a full and accurate picture of the mine. To enable the control center or the human supervising the control center to correctly instruct a mobile node to perform a certain action or to move to a certain location in the mine, in one embodiment, various marking elements 170 are distributed in the mine, either on the walls or on the floor 172 or on the ceiling of the mine, so that a spatial orientation in the mine can be established based solely on these marking elements. The marking elements may be placed as close as necessary to each other, for example, every 10 m, to also provide a depth impression for the operator of the control center or for the software applications that determine the next move of the mobile nodes. Further, the marking elements 170 may be implemented as simple mechanical objects having a known length and orientation, or they may have electronics 174 that are capable of emitting light, or other electromagnetic signals that can be captured by the VLC modules 128, and/or cameras 126, and/or cameras 330, so that these elements can also get a depth impression about their environment.

Figure 6:
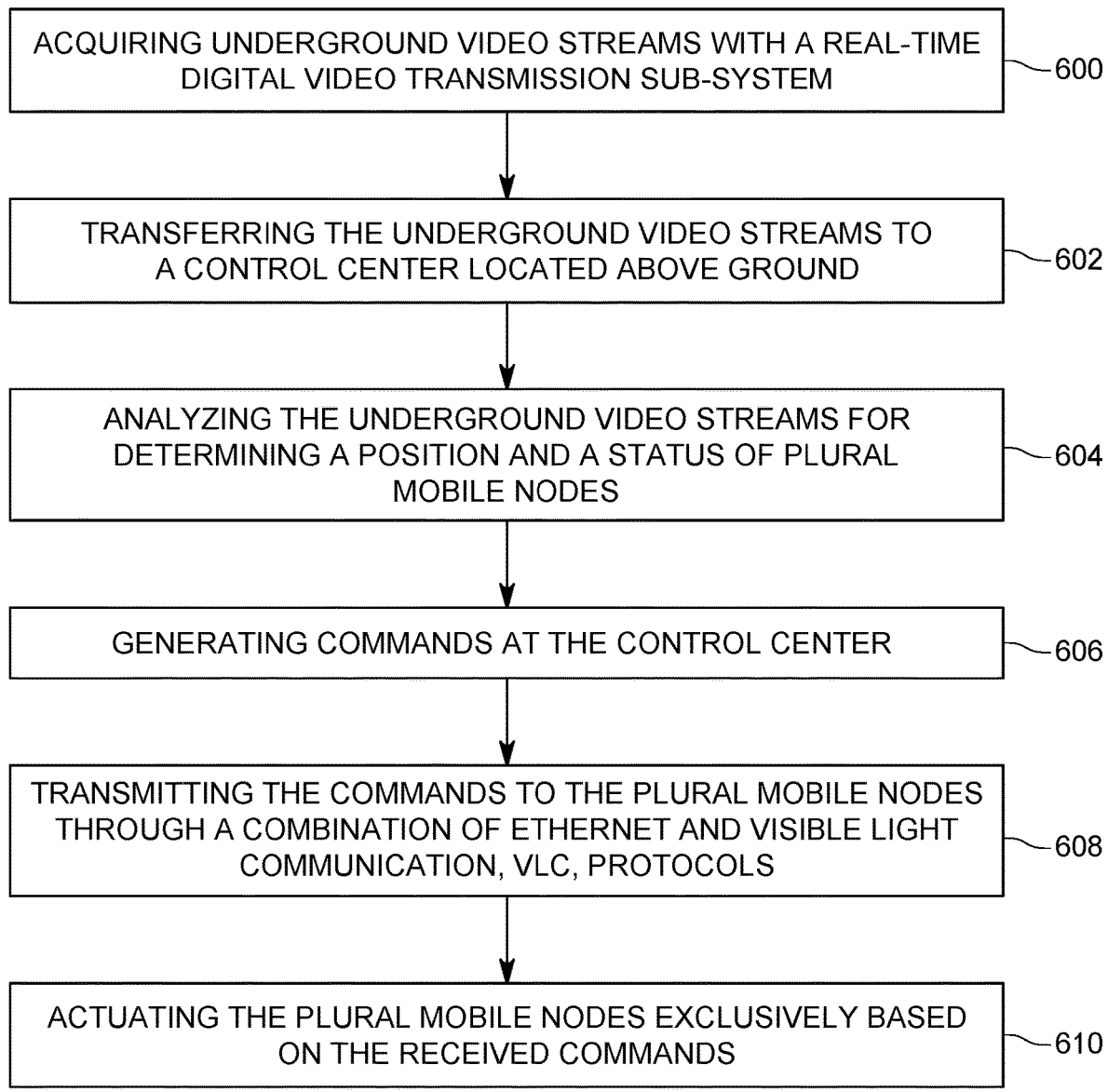
FIG. 6 is a flow chart of a method for exploring a mine with plural mobile nodes that are operated in an autonomous mode.

A method for autonomous mining exploration is now discussed with regard to FIG. 6. The method includes a step 600 of acquiring underground video streams 125, 127 with a real-time digital video transmission sub-system 110, a step 602 of transferring the underground video streams 125, 127 to a control center 115 located above ground, a step 604 of analyzing the underground video streams 125, 127 for determining a position and a status of plural mobile nodes 132, a step 606 of generating commands at the control center 115, a step 608 of transmitting the commands to the plural mobile nodes 132 through a combination of Ethernet and visible light communication, VLC, protocols, and a step 610 of actuating the plural mobile nodes 132 exclusively based on the received commands.

The plural mobile nodes are configured to extract a resource from underground and bring the resource to the surface. The resource may be any known resource, e.g., coal, copper, etc. The underground video streams include first video streams collected by cameras attached to a wall or ceiling of the mine, and second video streams collected by cameras located on the plural mobile nodes. In one application, the second video streams are transmitted from the plural mobile nodes to VLC modules exclusively through the wireless VLC protocol. The VLC modules and the cameras exchange data with the control center exclusively through the Ethernet protocol, thorough an optical fiber.

The disclosed embodiments provide an autonomous mining system that is capable of coordinating the movement and functions of plural mobile nodes inside of a mine, with no human presence in the mine, so that the coal or any other resource present in the mine is autonomously extracted and brought to the surface. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

REFERENCES

The entire content of all the publications listed herein is incorporated by reference in this patent application.
[1] Naidu, K. P. S. S. V., Visalakshi, P. and Chowdary, P. C., 2019. Coal mine safety system using Li-Fi technology.
[2] Chinese Patent Publication No. CN 105680942.

What is claimed is:

1. An autonomous mining system comprising:
a real-time digital video transmission sub-system configured to obtain video streams from underground, and transfer the video streams to a control center located above ground; and
an exploration and maintenance sub-system located underground, and configured to extract a resource and bring the resource to the surface, based exclusively on commands received from the control center through the real-time digital video transmission sub-system,
wherein the real-time digital video transmission sub-system comprises:
an optical wireless communication transceiver, attached to the underground, and configured to (1) receive commands from the control center at an Ethernet module, using an Ethernet protocol, and (2) optically communicate the commands with a light source, in a diffused light-of-sight or a non-line-of-sight configuration, to mobile nodes of the exploration and maintenance sub-system.

2. The system of claim 1, wherein the real-time digital video transmission sub-system comprises:
an above ground part that is configured to analyze the video streams and issue the commands; and
a below ground part that captures the video streams and also communicate using the optical wireless communication with the exploration and maintenance sub-system.

3. The system of claim 2, wherein the above ground part comprises:
a video surveillance system that receives the video streams and provide status information about the exploration and maintenance sub-system; and
a remote control system that, based on the status information received from the video surveillance system, instructs the mobile nodes of the exploration and maintenance sub-system to perform a given function.

4. The system of claim 3, wherein the given function includes one or more of moving from one point to another point, loading a truck, or drilling a hole.

5. The system of claim 2, wherein the below ground part comprises:
an optical fiber ring network configured to receive optical signals from the above ground part;
an optical fiber connected to the optical fiber ring network and configured to pass the optical signals;
plural cameras configured to generate the video streams and to send the video streams to the optical fiber; and
plural visible light communication, VLC, modules configured to optically communicate with the optical fiber and to wirelessly send the commands to the mobile nodes of the exploration and maintenance sub-system.

6. The system of claim 5, wherein the VLC modules include the optical wireless communication transceiver, the VLC modules communicate using the Ethernet protocol with the above ground part, and the optical wireless communication transceiver is configured to communicate in a wireless manner through ultraviolet light with the mobile nodes.

7. The system of claim 6, wherein the VLC modules transmit the commands from the above ground part directly to the mobile nodes.

8. The system of claim 5, wherein each VLC module comprises:
the light source for sending the commands to the mobile nodes;
a photodetector for receiving data from the mobile nodes;
a processor for processing the commands and the received data; and
the Ethernet module configured to transform electrical signals from the photodetector into a video stream to be injected into the optical fiber.

9. The system of claim 1, wherein the mobile nodes are configured to move and function underground without direct human intervention.

10. The system of claim 9, wherein the mobile nodes include one or more of a truck, drill rig, loader, and grader.

11. The system of claim 9, wherein each mobile node of the mobile nodes includes:
a photodetector for detecting the optical signal from a visible light communication, VLC, module associated with the real-time digital video transmission sub-system;
a camera for acquiring a video stream to be sent to the real-time digital video transmission sub-system;
a power supply;
a light source for sending optical signals indicative of the video stream to the VLC module; and
a processor that processes the optical signals and control the light source to send the video stream through a wireless visible light communication channel.

12. The system of claim 9, further comprising:
recharging stations distributed throughout the mine and configured to recharge a power supply of the mobile nodes.

13. The system of claim 1, further comprising:
a power supply located at the surface; and
a power supply line that extends from the power supply to inside of the mine to supply electrical power.

14. The system of claim 13, wherein visible light communication modules and cameras distributed in the mine are electrically connected to the power supply line.

15. The system of claim 14, wherein the visible light communication modules and the cameras are also optically connected to an optical fiber that supplies the video streams to the control center.

16. A method for autonomous mining exploration, the method comprising:
acquiring underground video streams with a real-time digital video transmission sub-system;

transferring the underground video streams to a control center located above ground;

analyzing the underground video streams for determining a position and a status of plural mobile nodes;

generating commands at the control center with respect to future actions of the plural mobile nodes;

transmitting the commands to the plural mobile nodes through a combination of (1) Ethernet protocol, between the control center and an optical wireless communication transceiver, which is attached to the wall or ceiling of the mine, and (2) optical light communication protocol, between the optical wireless communication transceiver and the plural mobile nodes; and actuating the plural mobile nodes, exclusively based on the received commands, to execute the actions.

17. The method of claim 16, wherein the plural mobile nodes are configured to extract a resource from underground and bring the resource to the surface.

18. The method of claim 16, wherein the underground video streams include first video streams collected by plural cameras attached to a wall or ceiling of the mine, and second video streams collected by cameras located on the plural mobile nodes.

19. The method of claim 18, wherein the second video streams are transmitted from the plural mobile nodes to VLC modules exclusively through the optical wireless protocol.

20. The method of claim 19, wherein the VLC modules and the plural cameras exchange data with the control center exclusively through the Ethernet protocol, through an optical fiber.

* * * * *